(12) United States Patent
Burk

(10) Patent No.: US 11,811,948 B2
(45) Date of Patent: Nov. 7, 2023

(54) FLEXIBLE SECURITY ENCLAVE FOR PROTECTING DATA AT REST AND IN MOTION

(71) Applicant: Micron Technology, Inc., Boise, ID (US)

(72) Inventor: Michael Tex Burk, Orangevale, CA (US)

(73) Assignee: Micron Technology, Inc., Boise, ID (US)

( * ) Notice: Subject to any disclaimer, the term of this patent is extended or adjusted under 35 U.S.C. 154(b) by 119 days.

(21) Appl. No.: 17/225,519

(22) Filed: Apr. 8, 2021

(65) Prior Publication Data

US 2022/0329437 A1    Oct. 13, 2022

(51) Int. Cl.
    *H04L 9/32*        (2006.01)
    *G06F 21/54*      (2013.01)
(52) U.S. Cl.
    CPC ............ *H04L 9/3247* (2013.01); *G06F 21/54* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 11,132,440 B2* | 9/2021 | Jung | G06F 21/71 |
| 2008/0298596 A1* | 12/2008 | Kuraki | G09C 5/00 380/283 |
| 2009/0132829 A1* | 5/2009 | Ohhashi | G06F 21/57 713/187 |
| 2021/0209219 A1* | 7/2021 | Park | H04L 9/3247 |

* cited by examiner

*Primary Examiner* — Jeffrey C Pwu
*Assistant Examiner* — Mayasa A. Shaawat
(74) *Attorney, Agent, or Firm* — Greenberg Traurig

(57) ABSTRACT

Disclosed are methods, devices, and computer-readable media for securing data in motion and at rest in a secure memory device. In one embodiment, a memory device is disclosed comprising a storage medium and a processor, the processor configured to: receive a software image, validate a digital signature associated with the software image, write the software image to the storage medium, receive a request to launch the software image from a host processor, validate the software image, and transmit the software image to the host processor.

17 Claims, 7 Drawing Sheets

FLEXIBLE SECURITY ENCLAVE FOR PROTECTING DATA AT REST AND IN MOTION

FIELD OF THE TECHNOLOGY

The disclosed embodiments are directed toward storage and application isolation. In particular, the disclosed embodiments are directed toward implementing software-based storage and application isolation in a secure memory device.

BACKGROUND

Various techniques have been proposed to provide application or storage isolation in secure devices. Software containers and virtual machines have been used to provide application-level isolation. That is, with these technologies, applications and libraries are "shielded" from one another and cannot inappropriate access data from one another. While software containers are transportable, they share software resources (e.g., operating systems, virtual hardware) which potentially expose sensitive data. Virtual machines remove this exposure, however they are platform-dependent and are tightly bound to an underlying hardware architecture.

For storage isolation, two current approaches involve the use of software containers or single-root input/output virtualization (SR-IOV). Since software containers are necessarily software-based, this approach suffers from the vulnerabilities of using shared hardware while mimicking storage isolation. SR-IOV exposes virtual functions to virtual machines or software containers, however SR-IOV is limited to specific storage interfaces (e.g., non-volatile memory express, NVMe).

Finally, another approach to provide the above isolation is to use a dedicated secure processing element such as a trusted execution environment (TEE). In a TEE, a dedicated processor, or portion of a processor, is configured to only execute securely. While providing security from software vulnerabilities, TEEs are limited to a single (secure) operating system, occupy a single trusted "zone" in the processor, are difficult to reconfigure, and are dependent on the underlying processing hardware.

More recently, researchers have proposed virtualized TEE (vTEE) systems. In these systems, the components of a TEE (e.g., operating system, firmware, etc.) are provided as a "bundle" that can run on insecure hardware. Thus, a single processor can potentially run multiple TEEs, similar to the deployment of virtual machines. While vTEE systems provide improved security, they are still software-based and thus are subject to all of the same problems identified above for containers and virtual machines.

BRIEF DESCRIPTION OF THE FIGURES

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

DETAILED DESCRIPTION

Figure 1:
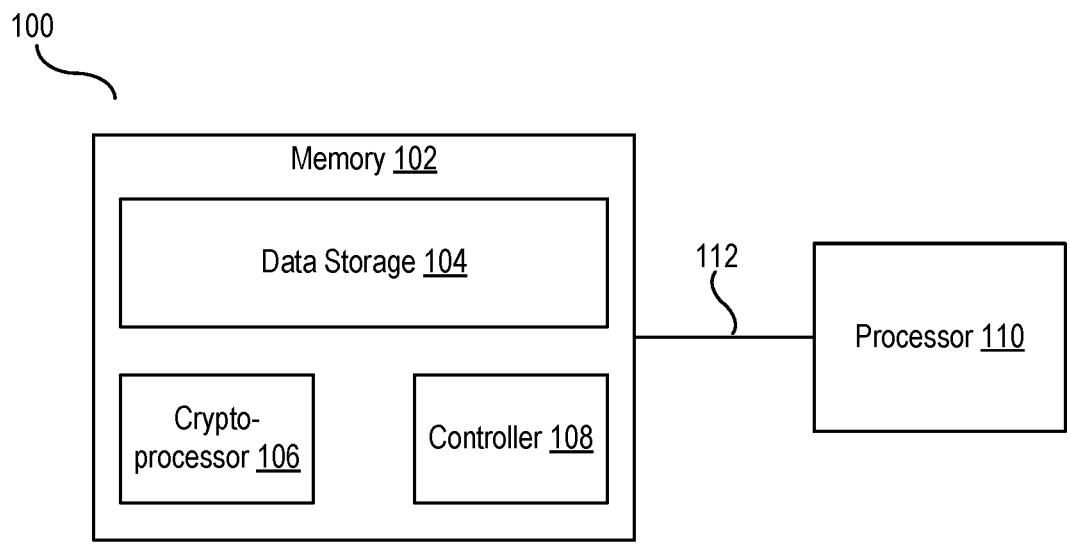
FIG. 1 is a block diagram of a secure computing system according to some embodiments of the disclosure.

FIG. 1 is a block diagram of a secure computing system according to some embodiments of the disclosure.

In the illustrated embodiment, a computing system (100) includes a processing element such as a processor (110) and a memory device (102). The memory device (102) includes data storage (104), controller (108), and cryptoprocessor (106). In some embodiments, cryptoprocessor (106) and controller (108) may be combined into a single device. The processor (110) and the memory device (102) are communicatively connected via bus (112).

In the illustrated embodiments, the processor (110) may comprise a central processing unit (CPU), system-on-a-chip (SoC), field-programmable gate array (FPGA), application-specific integrated circuit (ASIC), or other types of processing devices. In general, the processor (110) may comprise any electronic device designed to perform computations based on stored program instructions such as those stored in data storage (104).

In the illustrated embodiment, the memory device (102) may comprise a Flash memory device. In these embodiments, the memory device (102) may comprise a NAND Flash device, a NOR Flash device, or a heterogeneous Flash device that combines both NAND and NOR Flash. In these embodiments, the data storage (104) may comprise one or more Flash dies. In such embodiments, the one more Flash dies comprise a memory array. The memory array may comprise a plurality of Flash memory cells. In one embodiment, the array includes a plurality of SLC or MLC cells. In some embodiments, the array is homogenous (i.e., including only SLC or MLC cells). In other embodiments, the array may include multiple types of cells (i.e., a mix of SLC and MLC cells). Although reference is made to MLCs, other types of Flash memory cells may be used, such as triple-level cells (TLC), quad-level cells (QLC), penta-level cells (PLC), etc. In some embodiments, the cells may comprise pseudo-SLC (pSLC) cells. A pSLC cell comprises an MLC cell that may be configured to store a single bit of information, thus acting as an SLC cell. The array may comprise a planar, two-dimensional (2D) array of memory cells. Alternatively, the array may comprise a three-dimensional (3D) array of memory cells. The specific arrangement and type of cells in the array are not intended to be unduly limiting.

In another embodiment, the memory device (102) may comprise a dynamic random-access memory (DRAM)

device. In these embodiments, the data storage (104) may comprise an array of capacitive memory cells. In this embodiment, the data storage (104) may comprise an array of homogenous cells (e.g., memory cells having the same or similar ferromagnetic properties). In other embodiments, the data storage (104) may comprise an array of heterogeneous cells (e.g., memory cells having differing ferromagnetic properties). In some embodiments, the memory device (102) may comprise other types of RAM such as static RAM (SRAM), holographic RAM (HRAM), Resistive RAM (Re-RAM), phase-change memory (PCM), etc.

In the illustrated embodiment, the memory device (102) includes a controller (108). In the illustrated embodiment, the controller (108) may comprise a microcontroller, processor, or SoC configured to control the operation of the memory device (102). Specifically, in some embodiments, the controller (108) is configured to manage commands issued to the memory device (102) by, for example, the processor (110). Examples of commands include commands to read or write data to the data storage (104) as well as administrative commands. An exhaustive reference of commands is not included for the sake of brevity, and any commands used to access memory devices (e.g., Flash or DRAM) may be supported. In the illustrated embodiment, the controller (108) communicates with external devices (e.g., processor, 110) via a bus (112). In one embodiment, the bus (112) may comprise a serial peripheral interface (SPI) bus or embedded multimedia card (eMMC) bus.

In the illustrated embodiment, the memory device (102) further includes a cryptoprocessor (106). In one embodiment, the cryptoprocessor (106) comprises a dedicated processing element (e.g., ASIC, FPGA, processor, SoC, etc.) that performs cryptographic operations on data. In one embodiment, such operations include, but are not limited to, hashing, encryption, decryption, key generation, certificate generation, digital signature operations, and similar operations. In some embodiments, the cryptoprocessor (106) further includes a secure storage element (not illustrated) for storing secret data such as private keys and other types of secure data. In the illustrated embodiment, the cryptoprocessor (106) and controller (108) communicate via an internal data path (not illustrated) to support secure operations. For example, the controller (108) may forward commands received over the bus (112) to the cryptoprocessor (106) for authentication prior to executing the commands on the data storage (104). Conversely, the cryptoprocessor (106) may utilize the controller (108) to issue commands to the processor (110), such as requesting network access from the processor (110).

In one embodiment, the cryptoprocessor (106) enables the secure activation of the memory device (102) as well as a secure transfer of ownership of the memory device (102). In one embodiment, the memory device (102) includes a cryptographic manufacturer key provisioned by the manufacturer of the device. In one embodiment, this manufacturer key may comprise a symmetric or asymmetric key. If asymmetric, the manufacturer key may comprise a private key of a public-private key pair. In one embodiment, the manufacturer may maintain a record of which manufacturer key was written to which memory device. Specifically, each memory device (e.g., 102) may include a serial number or other unique identifiers. The manufacturer may then associate the manufacturer key with the unique identifier to maintain a record of each memory device. In the illustrated embodiment, the memory device (102) may include firmware or software to facilitate the transfer of ownership of the device. In one embodiment, the transfer of ownership is implemented by replacing the manufacturer key with a customer key. In other embodiments, the memory device (102) may retain the manufacturer key and store a public key of a customer in addition to the manufacturer key. In one embodiment, a key-management service is utilized to facilitate this transfer, as will be discussed.

Alternatively, or in conjunction with the foregoing, the cryptoprocessor (106) enables authenticated read and write and operations. In one embodiment, the memory device (102) may store a cryptographic customer key, as discussed above. When a processor (110) issues commands to the memory device, it may sign the commands using its corresponding cryptographic key (e.g., a private key) and issue the commands. The memory device (102) can then load a corresponding key (e.g., a public key) and validate the command to ensure it was issued by an authorized device (e.g., a customer device).

Alternatively, or in conjunction with the foregoing, the cryptoprocessor (106) enables cryptographic measurement capabilities. In these embodiments, the cryptoprocessor (106) is capable of measuring some or all of the data storage (104) and compute a cryptographic value (e.g., a hash value) of the contents. The cryptoprocessor (106) may then compare this computed value to an expected value to ensure that the contents of data storage (104) have not been modified prior to execution by the processor (110). In some embodiments, the memory device (102) includes a secure storage area that maintains an alternate image to be loaded in the event that a boot image cannot be verified using the above methodology.

Alternatively, or in conjunction with the foregoing, the cryptoprocessor (106) additionally includes various other cryptographic functions such as DICE-RiOT (Device Identity Composition Engine-Robust Internet of Things) two-factor asymmetric-cryptographic identity attestation.

Figure 2:
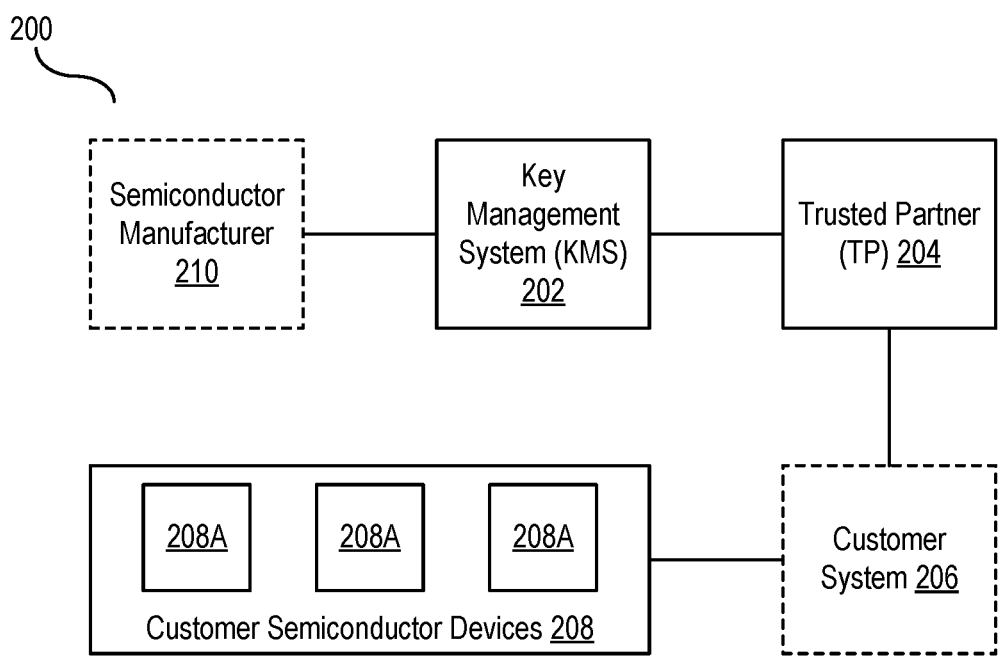
FIG. 2 is a block diagram illustrating an authentication system according to some embodiments of the disclosure.

FIG. 2 is a block diagram illustrating an authentication system according to some embodiments of the disclosure.

The illustrated system (200) includes a semiconductor device manufacturer (210), KMS (202), trusted partner (TP) (204), customer system (206), and a plurality of semiconductor devices (208). In the illustrated embodiment, the manufacturer (210) is the manufacturer of devices (208). In the illustrated embodiment, the manufacturer (210) can communicate with the KMS (202) via a secure channel. In some embodiments, the manufacturer (210) uploads, for each device (208), a corresponding unique identifier (UID) and a device secret key, also referred to as a manufacturer's storage root key (MFGSRK) to the KMS (202). In the illustrated embodiment, the MFGSRK is generated in a secure manufacturing environment of the manufacturer (210). In some embodiments, the manufacturer (210) also uploads a customer identifier (CID) for each customer that purchases or otherwise is associated with a device (208). In some embodiments, the manufacturer also uploads a customer authentication key (CAK) associated with a CID. In one embodiment, the CAK is limited to a specified date range, thus becoming invalid after the last day of the range passes. The UID, MFGSRK, CID, and CAK values are collectively referred to as "manufacturing data."

In the illustrated embodiment, the KMS (202) stores the aforementioned data received from the manufacturer (210). In one embodiment, the KMS (202) comprises a server, or multiple servers, for storing the manufacturing data. In some embodiments, the KMS (202) utilizes a hardware security module (HSM) to secure the manufacturing data. In the illustrated embodiment, the KMS (202) is capable of generating activation codes for each of the received UIDs. In some embodiments, an activation code comprises an integer or similar processible value. In some embodiments, the KMS (202) generates an activation code in response to a request from TP (204).

In the illustrated embodiment, the TP (204) comprises a computing system that is securely and communicatively coupled to KMS (202). In the illustrated embodiment, the TP (204) issues network requests to the KMS (202) for batches of activation codes (also referred to as an activation database). In one embodiment, the request for an activation database includes the CID, a date range, a device type, and a nonce unique to a customer and known by the KMS (202) (referred to as "KMS nonce"). In some embodiments, a customer negotiates the KMS nonce with the KMS (202) via a network communication session, thus establishing a commonly known value for the KMS nonce. In the illustrated embodiment, the TP (204) receives and stores the contents of the activation database. In some embodiments, the TP (204) also includes an HSM for securing the activation database. In the illustrated embodiment, the TP (204) also includes processing capabilities for generating a message authentication code (MAC) for a given customer. Further, in the illustrated embodiment, the TP (204) includes processing capabilities for generating a secure database of shared device secrets based on the activation codes in the activation database and response codes received from semiconductor devices (208).

In the illustrated embodiment, the customer system (206) communicates with the TP (204). The customer system (206) may comprise a customer's manufacturing line or other systems for handling semiconductor devices (208). The specific arrangement of computing devices of the customer system (206) is not limited herein. In some embodiments, TP (204) comprises one or more secure computing devices installed within a customer system (206). In other embodiments, the TP (204) is a separate computing system from the customer system (206).

In the illustrated embodiment, the customer system (206) interacts with a plurality of semiconductor devices (208a), (208b), (208c) (collectively, 208). The devices (208) comprise semiconductor devices such as, but not limited to, memory devices. For example, devices may comprise NOR or NAND Flash memory chips, SoC devices, or other types of discrete semiconductor packages.

The devices (208) include a plurality of non-volatile storage locations for storing various fields and parameters such as a CID and CAK. The devices (208) additionally include hardware or firmware capable of performing cryptographic operations such as operations supporting a MAC. Examples of such operations include HMAC-SHA256, AES, and CMAC operations. The details of devices (208) have been described more fully in the description of FIG. 1 and are not repeated herein.

Various techniques may be used to secure computing systems such as computing system (100). Details of such techniques, which may be used alone or in combination, are described herein.

Figure 3:
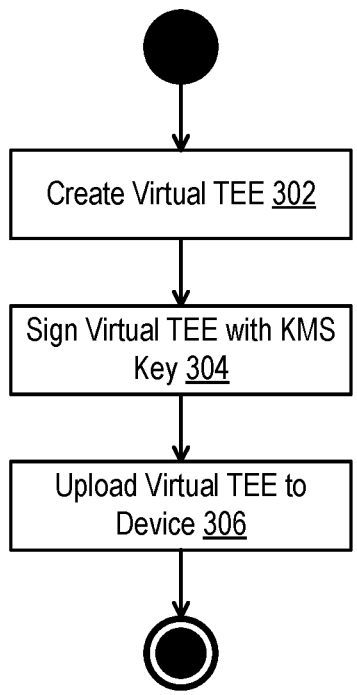
FIG. 3 is a flow diagram illustrating a method for creating and uploading a vTEE to a memory device according to some embodiments of the disclosure.

FIG. 3 is a flow diagram illustrating a method for creating and uploading a vTEE to a memory device according to some embodiments of the disclosure.

In block 302, the method creates a software or virtual TEE (referred to as a vTEE).

In one embodiment, a memory device is configured with a TEE hypervisor that manages one or more vTEEs stored on the device. The memory device may further include a secure gate element to enable context switching between vTEEs. Finally, the memory device may include a secure communications channel to allow communications between different vTEEs. The hypervisor controls the scheduling of vTEEs, data storage mapping, and assignment of any input/output (I/O) devices to vTEEs. Further, the hypervisor manages the installation of new vTEEs, the removal of vTEEs, as well as incremental updates to existing vTEEs.

In the illustrated embodiment, a vTEE comprises any executable code that is designed to operate in a secure manner. In some embodiments, the vTEE comprises an operating system for installation in the memory device. In many embodiments, the vTEE may comprise assembly lower-level code designed to interact directly with the hardware of the memory device (via the hypervisor). In some embodiments, the vTEE may additionally include various cryptographic primitives for performing cryptographic operations.

In block 304, the method signs the vTEE with a KMS key.

As discussed above, a KMS manages keys associated with memory devices. Via secure transfers of ownership, only a single authorized user or organization may have access to the keys to a memory device. In one embodiment, block 304 comprises signing a vTEE with a private key. In this embodiment, the associated public key is stored by the memory device. Thus, since the private key is known only to the valid user or organization that owns the memory device, only such an authorized user or organization can validly sign a vTEE.

In a first embodiment, block 304 may further include uploading the vTEE to a central server (e.g., a KMS). In this embodiment, the central server stores the private keys of the user/organization and manages access to those private keys. In this embodiment, the signing of a vTEE can be offloaded to the KMS such that the customer system is not required to perform signature generation. In one embodiment, the KMS may further be equipped to store the vTEE after generating the signature. In this scenario, the KMS can operate as a central repository for signed vTEE images.

In a second embodiment, block 304 may include a customer system signing the vTEE itself. In this scenario, the private keys are stored both by the KMS as well as by the customer themselves. Thus, in some embodiments, the customer system may sign vTEEs offline without requiring network access to communicate with the KMS.

In the illustrated embodiments, the virtual signature may be generated using a well-known digital signature algorithm such as Elliptic Curve Digital Signature Algorithm (ECDSA), ECDSA with Secure Hash Algorithm (SHA), and any other digital signature algorithm.

In block 306, the method comprises uploading the signed vTEE to the memory device.

In one embodiment, uploading the signed vTEE includes writing the vTEE to the memory device via an authenticated write command. In these embodiments, the command itself may be signed, in addition to the vTEE image. In another embodiment, uploading the signed vTEE may comprise transmitting the signed vTEE image from a central server to the memory device. In this embodiment, the memory device may communicate with a processor to access network interfaces to communicate with the central server.

In some embodiments, the memory device may support a separate command for writing a signed vTEE image. In other embodiments, the memory device may reserve a designated portion in the data storage to store vTEE images.

Figure 4:
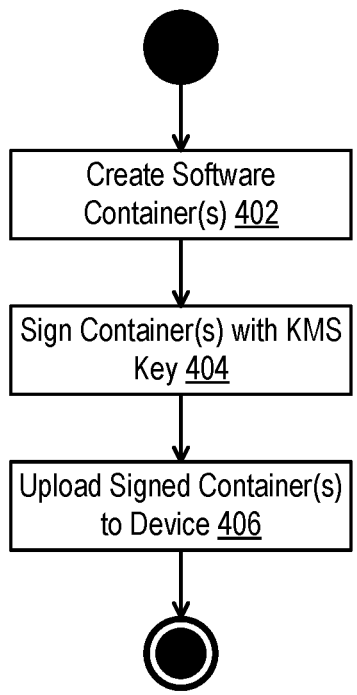
FIG. 4 is a flow diagram illustrating a method for creating and uploading a software container to a memory device according to some embodiments of the disclosure.

FIG. 4 is a flow diagram illustrating a method for creating and uploading a software container to a memory device according to some embodiments of the disclosure.

In block 402, the method creates one or more software containers. In one embodiment, a software container comprises a set of applications. Alternatively, or in conjunction with the foregoing, the software container may comprise libraries for use by applications. In one embodiment, the software containers may comprise Docker® container images. Other container technologies may be used, such as CoreOS, LXC (Linux Containers), etc. The specific technology used to create a software container is not limiting. Indeed, any technology that can containerize software applications or libraries may be used. Further, the software or libraries may comprise any arbitrary code, and the embodiments are not limited to specific types of libraries or applications. In the illustrated embodiment, the software container generally comprises an image or a set of images that containerize the desired applications or libraries. As an example, the software container may comprise a Docker® image file created using a Dockerfile and the docker image build command. Thus, the Dockerfile may define a set of applications and libraries and other details of the container to include in the software container.

In block 404, the method signs the containers with a KMS key. The details of block 404 may be substantially similar to those of block 304 and the full description of block 304 is not repeated herein for the sake of brevity.

Similar to block 304, block 404 may be executed by a KMS or by a local client device. When block 404 is executed by the KMS, the client uploads the software container to a central server (e.g., a KMS). Since the KMS manages public-private key pairs of the customer or client, the KMS identifies the appropriate private key and signs the uploaded software container. In one embodiment, the KMS may further be equipped to store the software container after generating the signature. In this scenario, the KMS can operate as a central repository for signed software containers and may thus act as a container registry. In a second embodiment, block 404 may include a customer system signing the software container itself. In this scenario, the private keys are stored both by the KMS as well as by the customer themselves. Thus, in some embodiments, the customer system may sign software containers offline without requiring network access to communicate with the KMS. As with block 304, the signature generated in block 404 may be generated using a well-known digital signature algorithm such as ECDSA, ECDSA with SHA, and any other digital signature algorithm.

In block 406, the method comprises uploading the signed software containers to the memory device. The details of block 406 may be substantially similar to those of block 306 and the full description of block 306 is not repeated herein for the sake of brevity. In one embodiment, the method comprises writing the software containers to the memory device via an authenticated write command. In another embodiment, uploading the signed software container may comprise transmitting the signed software container from a central server to the memory device. In some embodiments, the memory device may support a separate command for writing a signed software container. In other embodiments, the memory device may reserve a designated portion in the data storage to store signed software containers.

Figure 5:
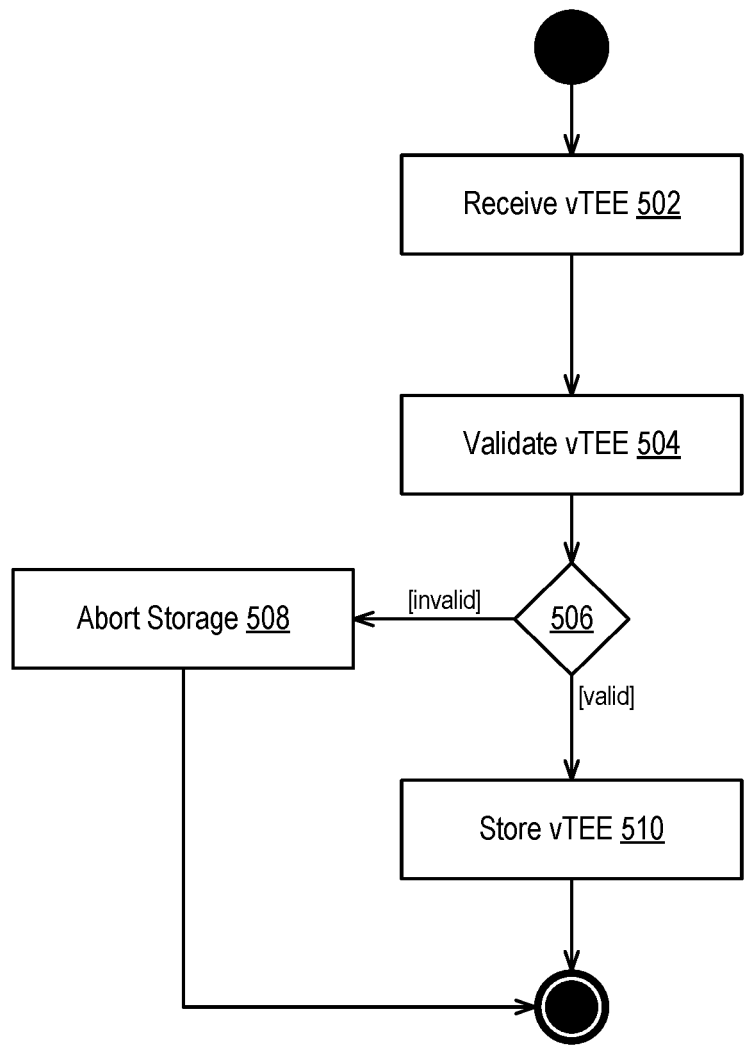
FIG. 5 is a flow diagram illustrating a method for storing a virtual TEE according to some embodiments of the disclosure.

FIG. 5 is a flow diagram illustrating a method for storing a vTEE according to some embodiments of the disclosure. In some embodiments, the methods discussed in FIG. 5 may be executed by a memory device such as a Flash storage device.

In block 502, the method comprises receiving the vTEE. As discussed in connection with FIG. 3, the method may receive the vTEE from a remote computing device or from a locally connected device. In either scenario, the vTEE comprises a file or set of files defining the vTEE. In some embodiments, the vTEE may be encrypted using a public key associated with the memory device. In some embodiments, the vTEE may be signed using a private key associated with a customer or client device.

In block 504, the method comprises validating the vTEE.

In one embodiment, the method validates a vTEE by validating a digital signature transmitted with the vTEE. In one embodiment, the digital signature is signed using a customer or client's private key. In the illustrated embodiment, the customer or client is the nominal owner of the memory device and may be the only authorized user to write data to the memory device. As discussed previously, the owner signs the vTEE with its secret private key (which is known to the customer/client and, in some embodiments, to a KMS). The memory device stores a corresponding public key (or may retrieve the public key from the KMS) and uses the public key to confirm the digital signature.

In some embodiments, as part of block 504, the method may decrypt the vTEE. In these embodiments, the vTEE may be encrypted with a public key associated with the memory device. The memory device stores the corresponding private key and thus can decrypt the vTEE. If the encryption fails, the memory device may abort storage of the vTEE (block 508).

In block 506, the method determines if the validation in block 504 was successful. If not, the method proceeds to block 508. If so, the method proceeds to block 510.

In block 508, the method aborts the storage of the vTEE. In this block, the method determined that the signature is invalid or corrupt. In either event, the method cannot confirm that the vTEE was signed by the owner of the memory device. Thus, in block 508, the method discards the received vTEE and halts processing of the vTEE. In some embodiments, the method may return an error code or similar return value indicating the failure to validate the vTEE.

In block 510, the method stores the vTEE when determining that the digital signature is valid. In one embodiment, the method writes the vTEE to a secure storage area of a storage medium.

In one embodiment, the method may further include computing one or more golden values representing the vTEE. As used herein, a golden value refers to a cryptographic value (e.g., a hash) that securely represents the contents of a file or files. In the illustrated embodiments, golden values may be stored in a secure location on the memory device that is not accessible outside of the memory device. As will be discussed, in some embodiments, the KMS may also generate golden values for vTEEs (and containers) and the memory device may be capable of remotely accessing these golden values. Notably, golden values are repeatable and may be computed at will. Thus, a golden value may be recomputed for a given file to confirm that the contents of the file match a previously computed golden value. The process of confirming that a file's golden value matches a previous golden value (and thus has not been tampered with) is referred to as attestation. When the golden values are computed in part by a KMS, it is referred to as remote attestation. Details of attestation are described more fully in the description of FIGS. 8 and 9.

Figure 6:
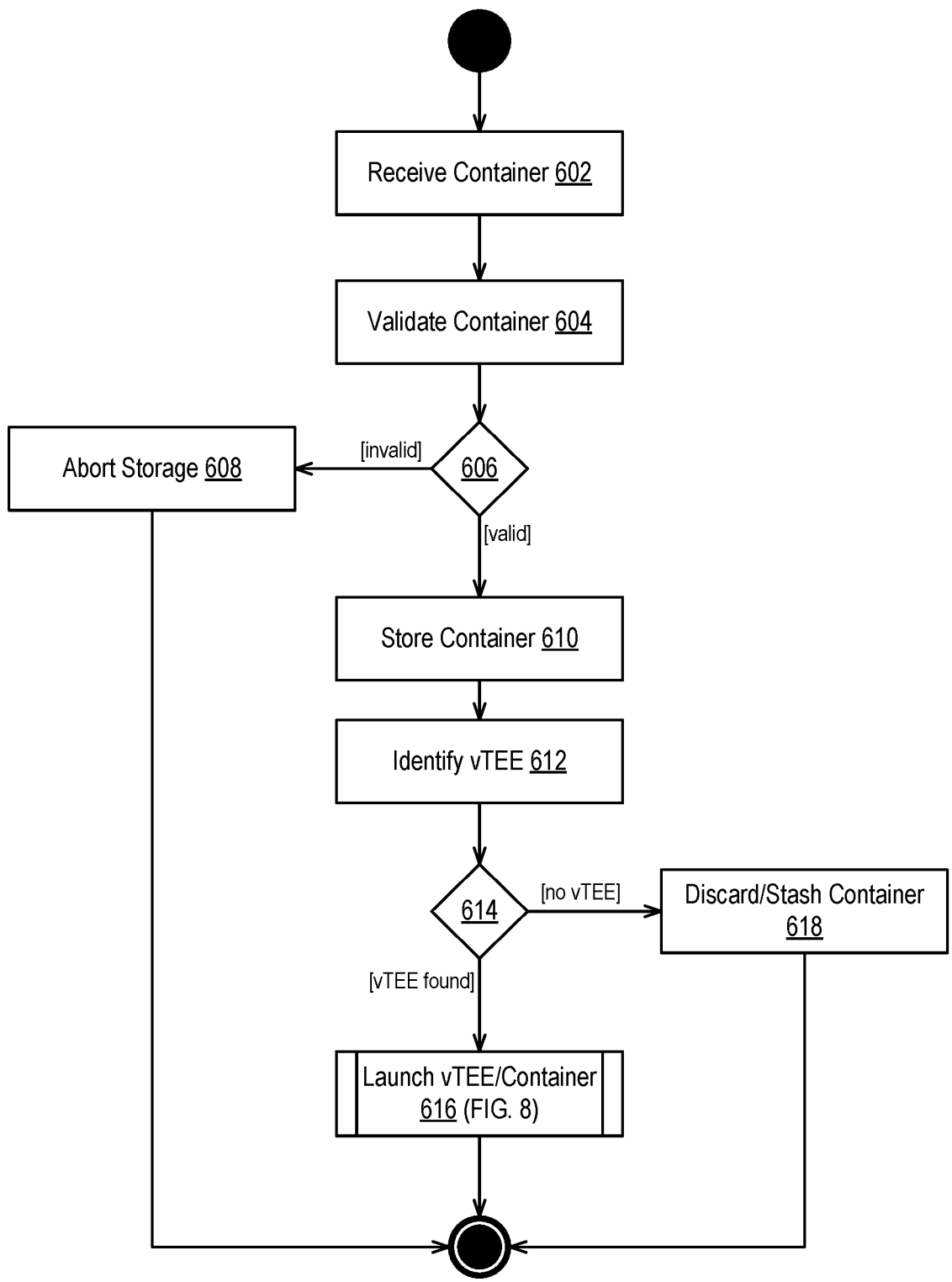
FIG. 6 is a flow diagram illustrating a method for storing a software container according to some embodiments of the disclosure.

FIG. 6 is a flow diagram illustrating a method for storing a software container according to some embodiments of the disclosure. In some embodiments, the methods discussed in FIG. 6 may be executed by a memory device such as a Flash storage device.

In block 602, the method receives a software container. As discussed above, a software container may comprise a file, or files, that include applications, libraries, and other executable objects. As discussed in connection with FIG. 4, the method may receive the software container from a remote computing device or from a locally connected device. In either scenario, the software container comprises a file or set of files defining the software container. For example, the software container may comprise a Docker® image. In some embodiments, the software container may be encrypted using a public key associated with the memory device. In some embodiments, the software container may be signed using a private key associated with a customer or client device.

In block 604, the method comprises validating the software container.

In one embodiment, the method validates a software container by validating a digital signature transmitted with the software container. Details of this step may be performed identically to those performed in block 504, the description of which is incorporated herein in its entirety and not repeated for the sake of brevity. Additionally, as discussed in connection with block 504, the software container may further be encrypted with a public key associated with the memory device and decrypted by a private key stored on the memory device. If the encryption fails, the memory device may abort the storage of the software container (block 608).

In block 606, the method determines if the validation in block 604 was successful. If not, the method proceeds to block 608. If so, the method proceeds to block 610.

In block 608, the method aborts the storage of the software container. In this block, the method determined that the signature is invalid or corrupt. In either event, the method cannot confirm that the software container was signed by the owner of the memory device. Thus, in block 608, the method discards the received software container and halts processing of the software container. In some embodiments, the method may return an error code or similar return value indicating the failure to validate the software container.

In block 610, the method stores the software container when determining that the digital signature is valid. In one embodiment, the method writes the software container to a secure storage area of a storage medium.

In one embodiment, the method may further include computing one more golden values representing the software container. Details of this step may be performed identically to those performed in block 610, the description of which is incorporated herein in its entirety and not repeated for the sake of brevity.

After storing the container, in block 612, the method comprises identifying a vTEE to use when executing the software container. In one embodiment, the vTEE may be assigned a globally unique identifier (GUID). In this embodiment, the container may be built by identifying this GUID. For example, the GUID may be included in a command in a Dockerfile (or similar file) used to build the image. Alternatively, the GUID may be stored as a tag in a manifest of the software container. In alternative embodiments, the memory device may only store a single vTEE and thus that single vTEE is identified in step 612. However, in scenarios where the memory device stores multiple vTEEs, the method analyzes the software container to determine which vTEE should be used to launch the software container.

In block 614, the method determines if a valid vTEE exists. As discussed, vTEEs may be stored in a secure location on the memory device. In the illustrated embodiment, the memory device maps vTEE identifiers (e.g., GUIDs) to memory locations and attempts to find a memory address associated with the vTEE identifier. If no such vTEE exists, the software container cannot be launched.

If the method cannot locate a correct vTEE, in block 618, the method will discard or stash the software container. In a first embodiment, the method may discard the software container. In this embodiment, the method triggers a panic and immediately removes the software container from the memory device. In some embodiments, the method may securely erase the stored software container. In some embodiments, the memory device may be configured to discard software containers when security is high since a software container missing a vTEE may be a malicious software container.

In another embodiment, the method may instead stash the software container for future use. In this embodiment, the method either maintains the software container at its existing storage location or moves the software container to a cache location. In this embodiment, the method may stash the software container to allow for delayed receipt of a vTEE. In one embodiment, the method stashes the software container indefinitely. In other embodiments, the method may only stash the software container for a fixed amount of time. After the expiration of this time, the method may then proceed to discard the software container as described above.

In another embodiment, alternatively or in conjunction with the foregoing, the method may proactively retrieve a vTEE. In this embodiment, the method uses the GUID or other identifier of the vTEE to query a trusted source such as the KMS. Specifically, the method may provide the GUID to the KMS and request the KMS to return a vTEE. The KMS may then attempt to find the vTEE in a database of vTEEs. If no match is found, the KMS returns an error, and the memory device may discard or stash the software container as discussed above. However, if the KMS can locate a vTEE, it returns the vTEE to the memory device. In this scenario, the memory device will execute the method of FIG. 5 to validate the vTEE. Then, the memory device may proceed to block 616. In this manner, the memory device can be configured to download vTEEs on-demand.

In block 616, the method launches the software container and vTEE. In this block, the memory device returns the software container and vTEE to a computing system (e.g., processor 110) for execution. In block 616, the method may further perform attestation and key binding operations to ensure the integrity of the software containers and vTEEs. Details of block 616 are described more fully in the descriptions of FIGS. 7 and 8, discussed next, and the disclosures of those figures are incorporated herein in their entirety.

Figure 7:
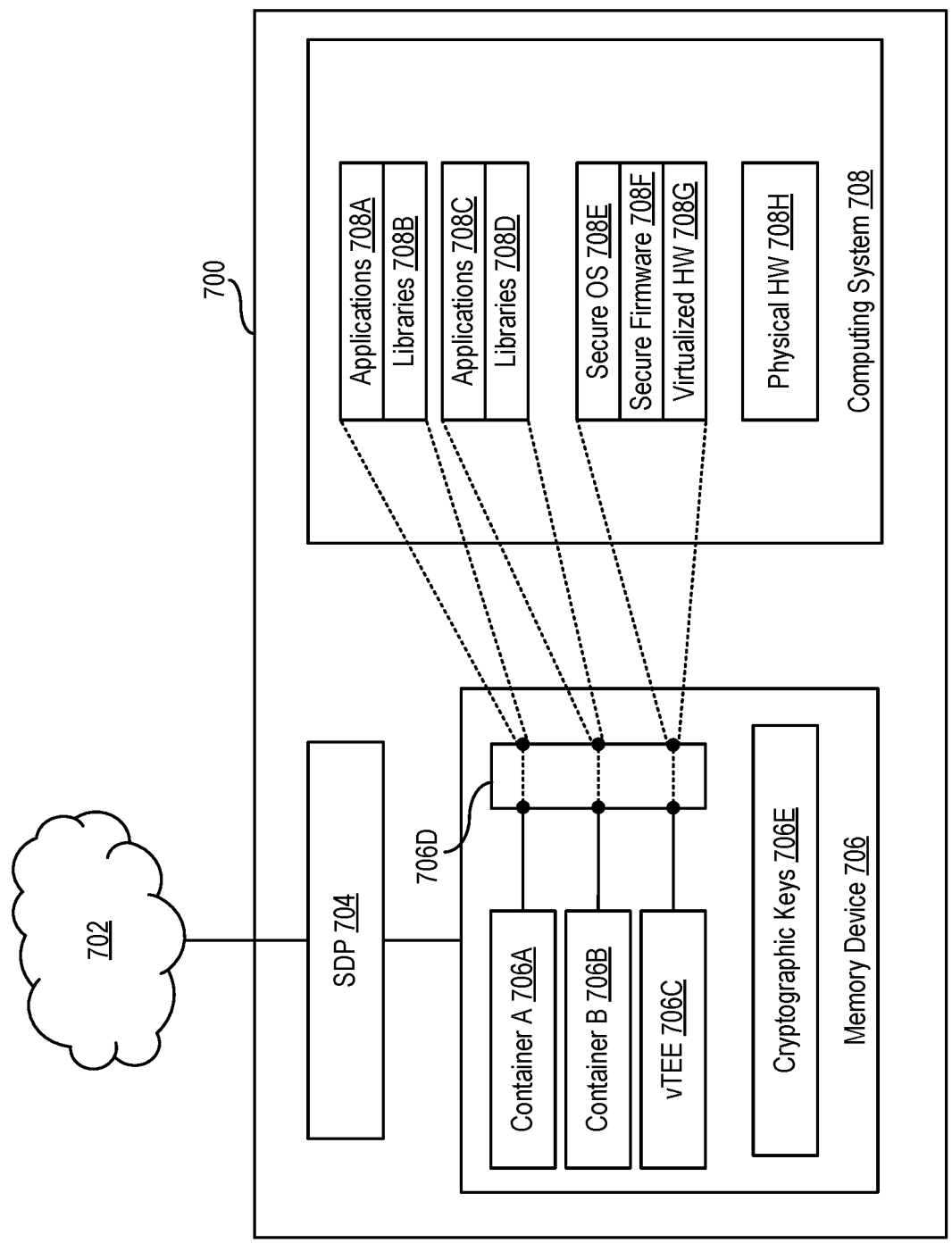
FIG. 7 is a block diagram illustrating a secure computing system according to some embodiments of the disclosure.

FIG. 7 is a block diagram illustrating a secure computing system according to some embodiments of the disclosure.

In the illustrated embodiment, a client platform (700) is communicatively coupled to a network (702). As discussed above, the client platform (700) may issue network requests to remote computing devices, such as a KMS, via network (702). In one embodiment, the client platform (700) may comprise an Internet-of-Things (IoT) device.

In the illustrated embodiment, the platform (700) may include a client-side software defined perimeter (SDP) (704). An SDP is an approach to network and communication security where no trust model exists. An SDP can mitigate attacks such as a distributed denial of service, man-in-the-middle, zero-day exploits, and server scanning, among others. Along with providing an overlay and microsegmentation for each attached device, the perimeter creates an invitation-only (identity-based) security perimeter around users, clients, and IoT devices. In the illustrated embodiment, the SDP (704) performs authentication of the platform (700) as well as state verification of the platform (700).

For authentication, the SDP (704) ensures that the memory device (706) includes valid cryptographic keys (706E). In the illustrated embodiment, the SDP (704) may communicate with a KMS to validate the cryptographic keys (706E) stored on the device. In one embodiment, the memory device (706) includes a unique identifier (UID) and a set of cryptographic keys (706E). The SDP (704) can use these two data points to confirm with the KMS that the cryptographic keys (706E) stored on the memory device (706) are correctly associated with the UID stored by the memory device (706).

For state validation, the SDP (704) may further be configured to ensure that the contents of the memory device (706) are valid. In one embodiment, the SDP (704) may be configured to perform one or more measurements on known sections of a storage array of the memory device (706) and confirm that these measurements are equal to expected measurement values.

Once the memory device (706) is authenticated, the SDP (704) sets up an individual network connection between the memory device (706) and the server it is trying to access (e.g., a KMS). The SDP (704) allocates a dedicated network connection that no one else can access and that only includes the services that the memory device (706) has approved access to. In one embodiment, this may comprise only allowing communication between the KMS and the memory device (706).

In the illustrated embodiment, software containers (706A, 706B) and vTEE (706C) are transmitted from a remote endpoint to the memory device (706) via the SDP (704). Thus, ensuring that the software containers (706A, 706B) and vTEE (706C) are only received from a known endpoint (e.g., the KMS). Details of receiving the software containers (706A, 706B) and vTEE (706C) are described in the preceding FIGS. 3 through 6 and are not repeated herein.

In the illustrated embodiment, the memory device (706) stores software containers (706A, 706B) and vTEE (706C) to be deployed to a computing system (708). In the illustrated embodiment, the computing system (708) may comprise an SoC or similar device. In general, the computing system (708) may comprise any computing system that includes a processing element (e.g., processor) and accessible hardware devices.

In the illustrated embodiment, the computing system (708) launches software containers (706A, 706B) and vTEE (706C) stored on the memory device (706). In the illustrated embodiment, the memory device (706) transfers the software containers (706A, 706B) and vTEE (706C) to the computing system (708) over a bus. In the illustrated embodiment, the memory device (706) stores two software containers (706A, 706B). A first container (706A) stores a first set of applications (708A) and libraries (708B). The second container (706B) stores a second set of applications (708C) and libraries (708D). Further, the vTEE (706C) includes a secure OS (708E), secure firmware (708F), and virtualized hardware (708G) (e.g., a virtual CPU, virtual volatile memory, virtual peripherals, etc.). In the illustrated embodiment, the software containers (706A, 706B) are both configured to execute in the vTEE (706C). That is, both software containers (706A, 706B) may identify a GUID of the vTEE (706C). Ultimately, the software containers (706A, 706B) and vTEE (706C) are run on the underlying physical hardware (708H) (e.g., physical CPU, DRAM, etc.) of the computing system (708).

In the illustrated embodiment, the memory device (706) is configured with attestation logic (706D) and cryptographic keys (706E). These two components enable a secure loading of the contents of the memory device (706) to the computing system (708).

In the illustrated embodiment, the attestation logic (706D) confirms the identity of the memory device (706) prior to releasing the software containers (706A, 706B) and vTEE (706C) to the computing system (708). In one embodiment, the memory device (706) includes a unique device secret (UDS) as part of the cryptographic keys (706E). In one embodiment, the UDS comprises a value unique to the memory device (706) and may be generated via a physically unclonable function (PUF). The UDS may also be stored by the KMS. In one embodiment, the memory device (706) uses the UDS (and/or other keys) to calculate a golden measurement of the software containers (706A, 706B) and vTEE (706C). The memory device (706) may store these golden measurements in a secure location in the storage array. Prior to transferring the software containers (706A, 706B) and vTEE (706C) to the computing system (708), the memory device (706) re-measures the software containers (706A, 706B) and vTEE (706C) and compares the latest measurements to the golden measurements. If the measurements match, the memory device (706) can attest that the software containers (706A, 706B) and vTEE (706C) are valid and untampered. However, if the measurements fail, the memory device (706) can prevent the transfer of any of the software containers (706A, 706B) or vTEE (706C) to the computing system (708), thus protecting the computing system (708) from a malicious software containers (706A, 706B) or vTEE (706C).

Figure 8:
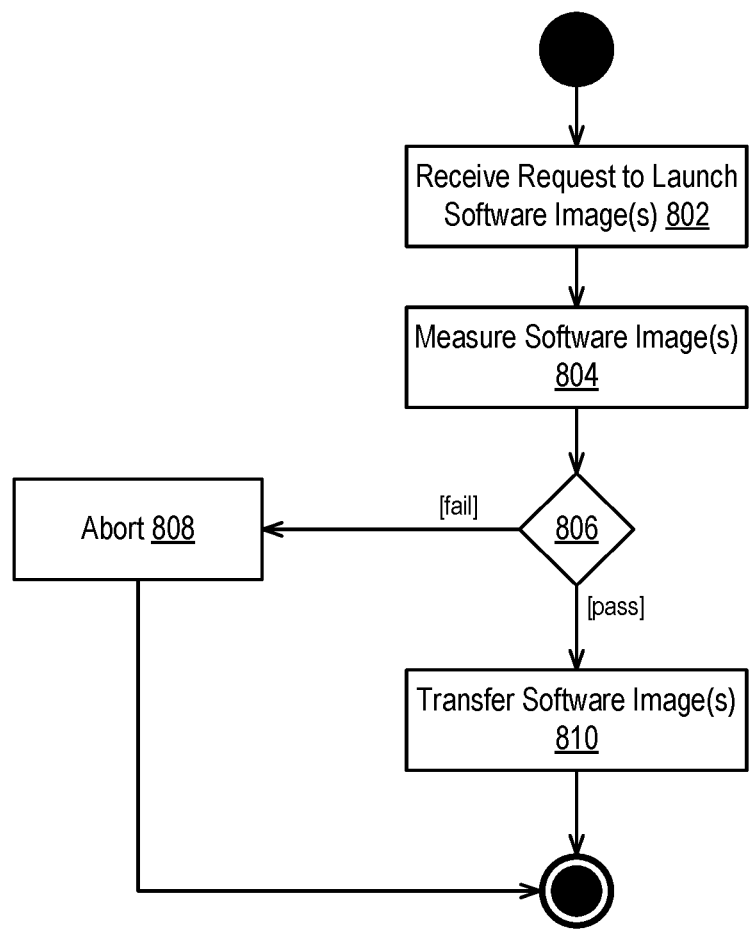
FIG. 8 is a flow diagram illustrating a method for launching a container or vTEE in a secure computing environment according to some embodiments of the disclosure.

FIG. 8 is a flow diagram illustrating a method for launching a container or vTEE in a secure computing environment according to some embodiments of the disclosure. In some embodiments, the methods discussed in FIG. 8 may be executed by a memory device such as a Flash storage device.

In block 802, the method comprises receiving a request to launch one or more software images. In one embodiment, a host processor issues a request to launch a software image to a memory device. In one embodiment, the request comprises a request to read the software image from the storage array of the memory device into a volatile memory accessible by the host processor.

In the illustrated embodiment, the software image may comprise a software container or a vTEE. In some embodiments, the request can identify a single software image (e.g., a single container or vTEE). In other embodiments, the request may identify multiple software containers, multiple vTEEs, or a combination of software containers and vTEEs.

In one embodiment, if the request only identifies one or more software containers, the method may automatically identify one or more corresponding vTEEs to return along with the software container. As described above, in some embodiments, the software containers are associated with identifiers associated with vTEEs. Thus, the memory device can automatically identify a vTEE without an explicit instruction to do so. Alternatively, or in conjunction with the foregoing, the converse may be true. That is, a given vTEE may be associated with one or more software containers. In this embodiment, the method may receive a request for a vTEE and automatically identify the required software containers to return.

In one embodiment, the request may only include a logical block address (LBA). In this embodiment, the method may identify the type of software image located at the LBA and determine what to return based on this identification, as discussed above. To implement this functionality, in a first embodiment, the memory device may maintain a mapping of LBA (or physical block address, PBA) values to software image types. In a second embodiment, the memory device may begin reading data at the LBA (or PBA) and determine the image type based on the first bytes of the image (e.g., a magic number).

In block 804, the method measures the software image(s). As discussed above, when the method downloads a software image, it may calculate a golden measurement. Since the image, upon immediate receipt, is guaranteed to be accurate, the memory device may perform this golden measurement at this point and store the calculated measurement in a secure and persistent memory location. For example:

$$M_{golden} = \text{HMAC}(\text{Key}_{private}, \text{image}) \quad \text{Equation 1}$$

In Equation 1, HMAC is a hash-based message authentication code algorithm that generates a fixed-length value, $\text{Key}_{private}$ comprises a private or otherwise secret value known to the memory device, and image comprises the binary contents of the software image. In one embodiment, $\text{Key}_{private}$ may comprise the UDS or other value generated by a PUF and thus is unique to the memory device. In other embodiments, the $\text{Key}_{private}$ comprises a private key (e.g., an asymmetric private key) shared with the KMS and customer. Notably, in some embodiments, if the value of $\text{Key}_{private}$ is generated based on a PUF, the value of $\text{Key}_{private}$ may never need to be stored permanently but rather can be generated based on the PUF as needed. Thus lack of storage of the $\text{Key}_{private}$ ensures that the key cannot be leaked.

In block 804, the method repeats the calculation on the current contents of the software image according to:

$$M_{current} = \text{HMAC}(\text{Key}_{private}, \text{image}_{current}) \quad \text{Equation 2}$$

In Equation 2, $\text{image}_{current}$ represents the binary contents of the currently stored software image, wherein the currently stored software image purportedly comprises the same image as image in Equation 1.

When the value of image in Equation 1 and the value of $\text{image}_{current}$ in Equation 2 are the same, the values of $M_{golden}$ and $M_{current}$ should be equal. However, if the software image was modified or tampered after being received (e.g., by a malicious user or by malware), the binary contents of image in Equation 1 and $\text{image}_{current}$ in Equation 2 will not be equal and thus $M_{golden}$ and $M_{current}$ will not be equal. The method may perform this calculation for each software image (e.g., software container or vTEE) to return.

In block 806, the method determines if any of the measurements fail. As discussed above, a measurement of a given software image fails when $M_{golden}$ and $M_{current}$ are not equal, thus in block 806, the method determines if $M_{golden} == M_{current}$ for each software image.

As discussed in block 804, the method may identify multiple software images to return. In some embodiments, the method will determine that a failure has occurred if a single software image fails, thus $$\text{pass} = \text{comp}_1 \&\& \text{comp}_2 \&\& \ldots \text{comp}_n \quad \text{Equation 3}$$

In Equation 3, $\text{comp}_i$ represents the comparison between a golden measurement ($M_{i,golden}$) and a current measurement ($M_{i,current}$) for a given software image (i), that is, $\text{comp}_i = M_{i,golden} == M_{i,current}$. If any of these comparisons fail, the method returns a global failure. In other words, the method will only pass if all software images are measured properly.

In an alternative embodiment, the method may fail or pass each individual software image:

$$\text{pass} = \text{comp}_1 \| \text{comp}_2 \| \ldots \text{comp}_n \quad \text{Equation 4}$$

In this embodiment, only images with passing measurements may be returned while images with failing measurements are not returned. In this embodiment, block 808 may be executed for each failing software image while block 810 may be executed for each passing software image. In this embodiment, the method does not abort in block 808 but rather returns an error code indicating the failed measurement(s). For the sake of brevity, the descriptions of blocks 808 and 810 presume that Equation 3 is used to confirm all measurements before proceeding.

If the method determines that any of the measurements have failed in block 806, the method proceeds to abort in block 808. In one embodiment, aborting comprises ceasing all processing of the software images and returning an error code to the host processor indicating that no data has been returned. In some embodiments, the error code further identifies which software images could not be validated. In some embodiments, the method may further remove those software images associated with failed measurements from the storage array. In some embodiments, the method may re-download those images after removing them. In some embodiments, after re-downloading the images, the method may return to block 804 to re-measure the previously failed images. In this scenario, if the re-measurement passes, the method can proceed to block 810.

If, on the other hand, if the method determines that all of the measurements of the software images pass, the method transmits the software images to the host processor in block 810. As described above in connection with FIG. 7, the host process may then copy the images to volatile memory and proceed to launch the software images.

Figure 9:
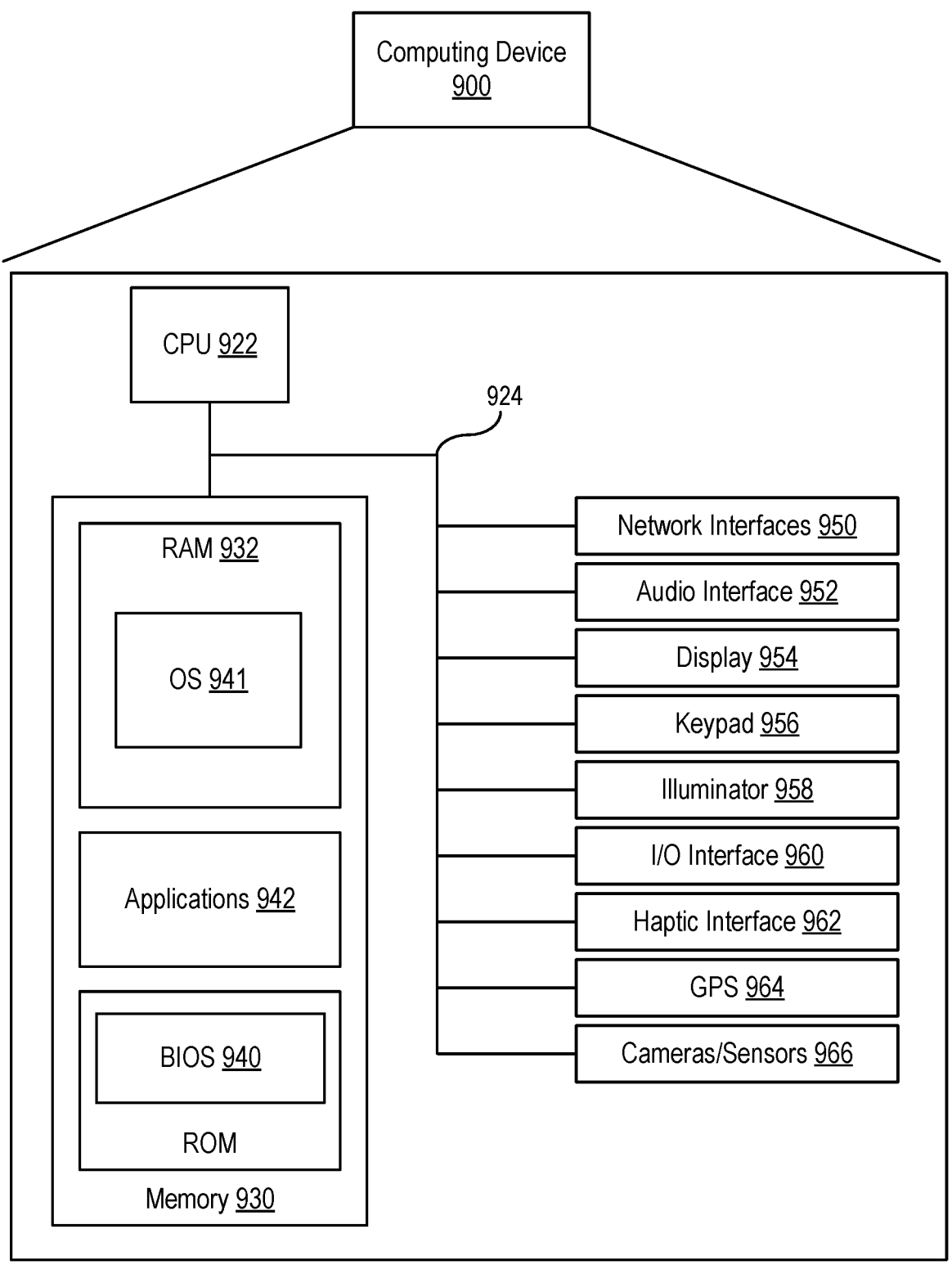
FIG. 9 is a block diagram illustrating a computing device showing an example of a client or server device used in the various embodiments of the disclosure.

FIG. 9 is a block diagram illustrating a computing device showing an example of a client or server device used in the various embodiments of the disclosure.

The computing device (900) can include more or fewer components than those shown in FIG. 9, depending on the deployment or usage of the device (900). For example, a server computing device, such as a rack-mounted server, may not include audio interfaces (952), displays (954), keypads (956), illuminators (958), haptic interfaces (962), Global Positioning Service (GPS) receivers (964), or cameras/sensors (966). Some devices can include additional components not shown, such as graphics processing unit (GPU) devices, cryptographic co-processors, artificial intelligence (AI) accelerators, or other peripheral devices.

As shown in the figure, the device (900) includes a central processing unit (CPU) (922) in communication with a mass memory (930) via a bus (924). The computing device (900) also includes one or more network interfaces (950), an audio interface (952), a display (954), a keypad (956), an illuminator (958), an input/output interface (960), a haptic interface (962), an optional global positioning systems (GPS) receiver (964) and a camera(s) or other optical, thermal, or electromagnetic sensors (966). Device (900) can include one camera/sensor (966) or a plurality of cameras/sensors (966). The positioning of the camera(s)/sensor(s) (966) on the device (900) can change per device (900) model, per device (900) capabilities, and the like, or some combination thereof.

In some embodiments, the CPU (922) can comprise a general-purpose CPU. The CPU (922) can comprise a single-core or multiple-core CPU. The CPU (922) can comprise a system-on-a-chip (SoC) or a similar embedded system. In some embodiments, a GPU can be used in place of, or in combination with, a CPU (922). Mass memory (930) can comprise a dynamic random-access memory (DRAM) device, a static random-access memory device (SRAM), or a Flash (e.g., NAND Flash) memory device. In some embodiments, mass memory (930) can comprise a combination of such memory types. In one embodiment, the bus (924) can comprise a Peripheral Component Interconnect Express (PCIe) bus. In some embodiments, the bus (924) can comprise multiple busses instead of a single bus.

Mass memory (930) illustrates another example of computer storage media for the storage of information such as computer-readable instructions, data structures, program modules, or other data. Mass memory (930) stores a basic input/output system ("BIOS") (940) for controlling the low-level operation of the computing device (900). The mass memory also stores an operating system (941) for controlling the operation of the computing device (900)

Applications (942) can include computer-executable instructions which, when executed by the computing device (900), perform any of the methods (or portions of the methods) described previously in the description of the preceding Figures. In some embodiments, the software or programs implementing the method embodiments can be read from a hard disk drive (not illustrated) and temporarily stored in RAM (932) by CPU (922). CPU (922) can then read the software or data from RAM (932), process them, and store them to RAM (932) again.

The computing device (900) can optionally communicate with a base station (not shown) or directly with another computing device. Network interface (950) is sometimes known as a transceiver, transceiving device, or network interface card (NIC).

The audio interface (952) produces and receives audio signals such as the sound of a human voice. For example, the audio interface (952) can be coupled to a speaker and microphone (not shown) to enable telecommunication with others or generate an audio acknowledgment for some action. Display (954) can be a liquid crystal display (LCD), gas plasma, light-emitting diode (LED), or any other type of display used with a computing device. Display (954) can also include a touch-sensitive screen arranged to receive input from an object such as a stylus or a digit from a human hand.

Keypad (956) can comprise any input device arranged to receive input from a user. Illuminator (958) can provide a status indication or provide light.

The computing device (900) also comprises an input/output interface (960) for communicating with external devices, using communication technologies, such as USB, infrared, Bluetooth®, or the like. The haptic interface (962) provides tactile feedback to a user of the client device.

The optional GPS receiver (964) can determine the physical coordinates of the computing device (900) on the surface of the Earth, which typically outputs a location as latitude and longitude values. GPS receiver (964) can also employ other geo-positioning mechanisms, including, but not limited to, triangulation, assisted GPS (AGPS), E-OTD, CI, SAI, ETA, BSS, or the like, to further determine the physical location of the computing device (900) on the surface of the Earth. In one embodiment, however, the computing device (900) can communicate through other components, provide other information that can be employed to determine a physical location of the device, including, for example, a MAC address, IP address, or the like.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
   a storage medium; and
   a processor, the processor configured to:
      receive a software image, the software image comprises a software container,
      validate a digital signature associated with the software image using a key management server (KMS) public key,
      write the software image to the storage medium,
      receive a request to launch the software image from a host processor,
      validate the software image,
      identify a virtual trusted execution environment (vTEE) based on an identification of the vTEE included in the software image, the vTEE selected from a plurality of vTEEs stored in the storage medium,
      validate the vTEE using the KMS public key,
      transmit the vTEE to the host processor, and
      transmit the software image to the host processor.

2. The memory device of claim 1, wherein prior to writing the software image to the storage medium, the processor is further configured to compute a golden measurement of the software image and write the golden measurement to a secure storage location in the storage medium.

3. The memory device of claim 2, wherein validating the software image comprises computing a current measurement of the software image and determining if the current measurement is equal to the golden measurement.

4. The memory device of claim 1, wherein validating the digital signature associated with the software image comprises reading a public key from the storage medium, the public key associated with a private key used to generate the digital signature, and validating the digital signature using the public key.

5. The memory device of claim 1, wherein receiving the software image comprises receiving the software image from a software-defined perimeter.

6. The memory device of claim 5, wherein receiving the software image comprises receiving the software image from the KMS.

7. A method comprising:
   receiving, at a memory device, a software image, the software image comprising a software container;
   validating, by a cryptographic processor of the memory device, a digital signature associated with the software image using a key management server (KMS) public 1 key;
   writing, by the memory device, the software image to a storage medium;
   receiving, by the memory device, a request to launch the software image from a host processor;
   validating, by the cryptographic processor of the memory device, the software image;
   identifying a virtual trusted execution environment (vTEE) based on an identification of the vTEE included in the software image, the vTEE selected from a plurality of VTEEs stored in the storage medium;
   validating the vTEE using the KMS public key;
   transmitting the vTEE to the host processor; and
   transmitting, by the memory device, the software image to the host processor.

8. The method of claim 7, wherein prior to writing the software image to the storage medium, the method further comprises computing, by the cryptographic processor of the memory device, a golden measurement of the software image and writing, by the cryptographic processor of the memory device, the golden measurement to a secure storage location in the storage medium.

9. The method of claim 8, wherein validating the software image comprises computing a current measurement of the software image and determining if the current measurement is equal to the golden measurement.

10. The method of claim 7, wherein validating the digital signature associated with the software image comprises reading a public key, the public key associated with a private key used to generate the digital signature, and validating the digital signature using the public key.

11. The method of claim 7, wherein receiving the software image comprises receiving the software image from a software-defined perimeter.

12. The method of claim 11, wherein receiving the software image comprises receiving the software image from a key-management server.

13. A non-transitory computer-readable storage medium for tangibly storing computer program instructions capable of being executed by a computer processor, the computer program instructions defining steps of:
   receiving a software image, the software image comprising a software container;
   validating a digital signature associated with the software image using a key management server (KMS) public key;
   writing the software image to a storage medium;
   receiving a request to launch the software image from a host processor;
   validating the software image;
   identifying a virtual trusted execution environment (vTEE) based on an identification of the vTEE included in the software image, the vTEE selected from a plurality of VTEEs stored in the storage medium;
   validating the vTEE using the KMS public key;
   transmitting the vTEE to the host processor; and
   transmitting the software image to the host processor.

14. The non-transitory computer-readable storage medium of claim 13, wherein prior to writing the software image to the storage medium, the computer program instructions further define a step of computing a golden measurement of the software image and writing the golden measurement to a secure storage location in the storage medium.

15. The non-transitory computer-readable storage medium of claim 14, wherein validating the software image comprises computing a current measurement of the software image and determining if the current measurement is equal to the golden measurement.

16. The non-transitory computer-readable storage medium of claim 13, wherein validating the digital signature associated with the software image comprises reading a public key from the storage medium, the public key associated with a private key used to generate the digital signature, and validating the digital signature using the public key.

17. The non-transitory computer-readable storage medium of claim 13, wherein receiving the software image comprises receiving the software image from a software-defined perimeter.

\* \* \* \* \*